3,575,980
5H-DIBENZO(a,d)CYCLOHEPTEN-10-YL-PIPERAZINE DERIVATIVES

Michele Mastursi, Naples, Sabino Lembo, Pozzuoli, and Rene Viterbo, Naples, Italy, assignors to Richardson-Merrell S.p.A., Naples, Italy
No Drawing. Filed Mar. 25, 1968, Ser. No. 715,536
Int. Cl. C07d 51/70
U.S. Cl. 260—268      10 Claims

ABSTRACT OF THE DISCLOSURE

New en-amines of the formula:

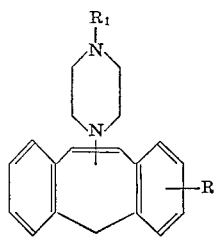

in which R may be hydrogen, halogen, or lower alkyl, and $R_1$ represents a nitrogen-containing substituent, preferably a carboxamide or a thiocarbamide. These new compounds are useful because of their pharmacological activities which include muscle relaxing, anti-inflammatory, anti-pyretic, analgesic, and sedative action. A preferred method of making the new compounds is described.

---

The present invention relates to new en-amines having the following characteristic group:

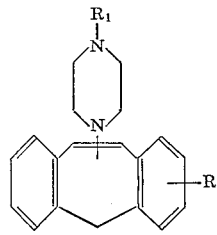

in which R is hydrogen, halogen, or lower alkyl, and $R_1$ represents a nitrogen-containing substituent, preferably a carboxamide or a thiocarbamide.

Compounds having the above-indicated general formula are useful for several purposes on account of their pharmacological activities which are dependent upon the substituent groups R and $R_1$. More specifically, their pharmacological activity makes them useful primarily as therapeutic agents. These pharmacological activities include muscle relaxing, anti-inflammatory, anti-pyretic, analgesic, and sedative actions.

Preferably, the new compounds of the present invention are prepared by the action of a suitable alkylating, acylating, or arylating agent on the secondary amino group of the piperazine moiety of N-[5H-dibenzo(a,d)cycloheptene-10-yl]-piperazine. If desired, however, these same compounds can be made by reacting an appropriately substituted piperazine with a 10,11-dihydro-5H-dibenzo(a,d)cycloheptene-10-one or a 10-bromo-5H-dibenzo(a,d)cycloheptene.

The preferred method of preparing the compounds of the present invention is as follows: To the N-substituted piperazine derivative dissolved in an anhydrous aprotic solvent, such as benzene, toluene, or other aromatic or aliphatic hydrocarbon or ethyl ether, is added the alkylating, arylating, or acylating agent if necessary in the presence of a suitable base, such as anhydrous sodium carbonate or bicarbonate, or other basic alkali metal salt or alcoholate or organic tertiary nitrogen base, such as pyridine, alkylpiperidine, triethylamine, or anionic ion exchange resin. The reaction temperature can be chosen in the range from 0° C. to boiling temperature of the solvent, and the reaction time is between 1 hour and 24 hours, depending on the reactivity of the compounds involved in the reaction. The reaction mixture is extracted with a water non-miscible solvent, such as ethyl ether, ethyl acetate, benzene, toluene, chloroform, or other. The organic layer is concentrated and the residue crystallized from a suitable solvent, such as benzene, methanol, or ethyl acetate.

The most pertinent prior art known to applicants includes the publication by W. Tochtermann et al., Ber. 97, 1318 (1964). The Tochtermann et al. publication describes the synthesis of piperidide but not piperazine derivatives however. Belgian Patent 678,483 issued recently to Rhone-Poulenc on dibenzocycloheptatriene derivatives describes certain en-amines which, however, do not have a nitrogen-containing substituent, $R_1$, on the piperazine moiety.

The invention will be illustrated now by examples showing the preparation of a number of the compounds of the present invention.

EXAMPLE I

N-[5H-dibenzo(a,d)cyclohepten-10-yl]-N'-(N-methylacetamide)-piperazine 52 grams (249 mmol.) 10,11-dihydro-5H-dibenzo(a,d)cyclohepten-10-one,[1]
129.2 grams (1499 mmol.) piperazine, and
43 grams (226 mmol.) p-toluenesulfonic acid monohydrate were dissolved in 1200 ml. anhydrous toluene.

The solution was refluxed for 100 hours, separating off the formed water with a Dean-Stark trap. The cooled solution was partitioned between toluene and water; the toluene solution was washed with water and extracted with a 0.1 N solution of maleic acid. The cooled acid solution was made alkaline with a saturated solution of $NaHCO_3$, and the oil which separated was extracted with ethyl ether. The organic solution was washed with water until neutral, dried over $Na_2SO_4$, and distilled. The oily dark residue was crystallized from ethyl ether yielding 48 grams of N-[5H-dibenzo(a,d)cyclohepten-10-yl]-piperazine with a melting point of 115 to 117° C.

To a solution of 5.52 grams (20 mmol.) N-[5H-dibenzo(a,d)cyclohepten-10-yl]-piperazine in
60 ml. anhydrous benzene were added
10 grams (100 mmol.) anhydrous $Na_2CO_3$ and
2.36 grams (22 mmol.) N-methylchloroacetamide.

The mixture was refluxed under stirring for 24 hours. After cooling, it was poured over crushed ice and extracted with benzene. The aqueous phase was discarded. The organic phase was washed with water until neutral, dried over $Na_2SO_4$, and distilled under vacuum (water pump). The solid residue was crystallized from ethyl acetate yielding 6.5 grams of white crystals with a melting point of 198 to 200° C.

U.V. in ethanol 95%
λ max.=301 mμ; ε=13,100

---

[1] N. J. Leonard et al., J. Am. Chem. Soc., 77, 5078 (1955).

EXAMPLE II

N-[5H-dibenzo(a,d)cyclohepten-10-yl]-N'-
(N-ethylacetamide)-piperazine

To a solution of 22.11 grams (80 mmol.) N-[5H-dibenzo(a,d)cyclo-
hepten-10-yl]-piperazine in
250 ml. anhydrous benzene were added
42.4 grams (400 mmol.) anhydrous $Na_2CO_3$ and
10.7 grams (88 mmol.) N-ethylchloroacetamide.

The mixture was refluxed under stirring for 24 hours. After cooling, it was poured over crushed ice, and then extracted with benzene. The benzene phase was washed with water until neutral, dried over anhydrous $Na_2SO_4$, and the solvent distilled under vacuum (water pump). The residue was crystallized from ethanol yielding 23 grams of compound with a melting point of 170 to 172° C.

U.V. in ethanol 95%
$\lambda_{max.}=301$ m$\mu$; $\epsilon=13,000$

EXAMPLE III

N-[5H-dibenzo(a,d)cyclohepten-10-yl]-N'-(N-n-
propylacetamide)-piperazine

To a solution of 22.11 (80 mmol.) N-[5H-dibenzo(a,d)cyclohepten-10-
yl]-piperazine in
250 ml. anhydrous benzene were added
42.4 grams (400 mmol.) anhydrous $Na_2CO_3$ and
11.9 grams (88 mmol.) N-n-propylchloroacetamide.

The mixture was refluxed for 24 hours under efficient stirring, cooled, and poured over crushed ice, and then extracted with benzene. The benzene phase was washed with water until neutral, dried over anhydrous $Na_2SO_4$, and the solvent distilled under vacuum (water pump). The residue was crystallized from benzene/petroleum ether (40 to 70° C.) yielding 17 grams of compound with a melting point of 124 to 126° C.

U.V. in ethanol 95%
$\lambda_{max.}=302$ m$\mu$; $\epsilon=12,300$

EXAMPLE IV

N-[5H-dibenzo(a,d)cyclohepten-10-yl]-N'-[N,N-
dimethylacetamide]-piperazine

To a solution of 22.11 grams (80 mmol.) N-[5H-dibenzo(a,d)cyclohepten-
10-yl]-piperazine in
250 ml. benzene were added
42.4 grams (400 mmol.) anhydrous $Na_2CO_3$ and
10.7 grams (88 mmol.) N,N-dimethylchloroacetamide.

The mixture was refluxed for 24 hours under efficient stirring, cooled, poured over crushed ice, and extracted with benzene. The benzene phase was washed with water until neutral, dried over $Na_2SO_4$, and the solvent distilled under vacuum. The residue (27 grams) of dark oil was redissolved in benzene and passed through a Florisil column 50–60 mesh. It was concentrated to small volume and allowed to crystallize. The melting point was 156 to 158° C.

U.V. in ethanol 95%
$\lambda_{max.}=302$ m$\mu$; $\epsilon=13,300$

EXAMPLE V

N-[5H-dibenzo(a,d)cyclohepten-10-yl]-N'-n-
butylcarboxamide-piperazine 2.76 grams (10 mmol.) N-[5H-dibenzo(a,d)cyclohepten-
10-yl]-piperazine and
1.98 grams (20 mmol.) n-butyl isocyanate were dissolved
in
70 ml. anhydrous benzene.

The solution was left at room temperature for 48 hours and then at 4° C. for 10 hours. The white crystalline precipitate was filtered off, washed with cold benzene, and then dried. The obtained 2 grams were crystallized from methanol and had a melting point of 182 to 183° C.

U.V. in ethanol 95%
$\lambda_{max.}=300$ m$\mu$; $\epsilon=13,200$

EXAMPLE VI

N-[5H-dibenzo(a,d)cyclohepten-10-yl]-piperazine-
N'-yl-phenylcarboxamide 1 gram (3.6 mmol.) N-[5H-dibenzo(a,d)cyclohepten-10-
yl]-piperazine and
0.86 gram (7.2 mmol.) phenyl isocyanate in
27 ml. anhydrous benzene were left overnight at room temperature. The mixture was cooled at 4° C., and the obtained precipitate was filtered off, dissolved in chloroform, filtered through a small layer of $Al_2O_3$, and crystallized from benzene-methanol yielding 0.62 gram of compound with a melting point of 212 to 214° C.

U.V. in ethanol 95%
$\lambda_{max.}=239$ m$\mu$; $\epsilon=32,900$
$\lambda_{max.}=299$ m$\mu$; $\epsilon=13,500$

EXAMPLE VII

N-[5H-dibenzo(a,d)cyclohepten-10-yl]-piperazine-
N'-yl-(o-chlorophenylcarboxamide)

1 gram (3.6 mmol.) N-[5H-dibenzo(a,d)cyclohepten-10-
yl]-piperazine and
1.1 grams (7.2 mmol.) o-chlorophenyl isocyanate in
27 ml. anhydrous benzene were left at room temperature overnight. The obtained white crystalline precipitate was filtered, yielding 1 gram of compound which, crystallized from chloroform-methanol, had a melting point of 189 to 192° C.

U.V. in ethanol 95%
$\lambda_{max.}=234$ m$\mu$; $\epsilon=27,000$
$\lambda_{max.}=299$ m$\mu$; $\epsilon=13,500$

EXAMPLE VIII

N-[5H-dibenzo(a,d)cyclohepten-10-yl]-piperazine-
N'-yl-(p-chlorophenylcarboxamide)

1 gram (3.6 mmol.) N-[5H-dibenzo(a,d)cyclohepten-10-
yl]-piperazine and
1.1 grams p-chlorophenyl isocyanate (7.2 mmol.) in
27 ml. anhydrous benzene were left overnight at room temperature. The precipitated white crystals were filtered. Yield was 1.4 grams (crystallized from chloroform-methanol) with a melting point of 189 to 192° C.

U.V. in ethanol 95%
$\lambda_{max.}=247.5$ m$\mu$; $\epsilon=37,000$
$\lambda_{max.}=296$ m$\mu$; $\epsilon=14,250$

EXAMPLE IX

N-[5H-dibenzo(a,d)cyclohepten-10-yl]-piperazine-
N'-yl-(m-chlorophenylcarboxamide)

1 gram (3.6 mmol.) N-[5H-dibenzo(a,d)cyclohepten-10-
yl]-piperazine and
1.1 grams (7.2 mmol.) m-chlorophenyl isocyanate in 27 ml.
anhydrous benzene were left at room temperature. Petroleum ether (10 ml.) was added and, after some hours, the crystalline precipitate was filtered off. It was crystallized from chloroform-methanol yielding 0.8 gram of compound with a melting point of 182 to 185° C.

U.V. in ethanol 95%
$\lambda_{max.}=245$ m$\mu$; $\epsilon=33,800$
$\lambda_{max.}=299$ m$\mu$; $\epsilon=13,950$

EXAMPLE X

N-[5H-dibenzo(a,d)cyclohepten-10-yl]-piperazine-N'-yl-phenylthiocarboxamide 2 grams (7.2 mmol.) N-[5H-dibenzo(a,d)cyclohepten-10-yl]-piperazine were dissolved in
25 ml. anhydrous benzene and to this was added
2.2 ml. (33 mmol.) acrylonitrile were dissolved in
10 ml. anhydrous benzene and it was kept at room temperature for 12 hours. The white solid precipitate which was formed during the reaction was filtered off, washed with benzene, and dried. The 2.5 grams that were obtained were crystallized from chloroform-methanol yielding 1.48 grams of compound with a melting point of 210 to 214° C.

U.V. in ethanol 95%
$\lambda$ max.=250 m$\mu$; $\epsilon$=25,700

EXAMPLE XI

N-[5H-dibenzo(a,d)cyclohepten-10-yl]-N'-($\beta$-cyanoethyl)-piperazine 1.2 grams (4.3 mmol.) N-[5H-dibenzo(a,d)cyclohepten-10-yl]-piperazine and
2.2 ml. (33 mmol.) acrylonitrile where dissolved in 10 ml. anhydrous benzene and refluxed for 15 hours. The solution was concentrated under vacuum (water pump). The residue was crystallized from chloroform-methanol yielding 0.88 gram of compound with a melting point of 143 to 145° C.

U.V. in ethanol 95%
$\lambda$ max.=302 m$\mu$; $\epsilon$=13,200

EXAMPLE XII

N-[5H-dibenzo(a,d)cyclohepten-10-yl]-N'-3-picolylpiperazine

To 2 grams (7.2 mmol.) of N-[5H-dibenzo(a,d)cyclohepten-10-yl]-piperazine dissolved in 20 ml. of ethanol containing 4.6 grams of anhydrous Na$_2$CO$_3$ were slowly added, under stirring 1.3 grams (7.9 mmol.) 3-chloromethylpyridine hydrochloride dissolved in 30 ml. of ethanol. The mixture was refluxed under stirring for 18 hours. It was cooled, poured into water, and the obtained precipitate filtered off, washed with water, and dried. It was crystallized from chloroform-ethanol yielding 0.8 gram of white crystals with a melting point of 208 to 212° C.

U.V. in ethanol 95%
$\lambda$ max.=301 m$\mu$; $\epsilon$=13,400

EXAMPLE XIII

N-[5H-dibenzo(a,d)cyclohepten-10-yl]-N'-3-diethylaminoethyl-piperazine

A mixture of 3 grams (14.7 mmol.) 10,11-dihydro-5H-dibenzo(a,d)cyclohepten-10-one,
5.3 grams (28.6 mmol.) N-(2-diethylaminoethyl)-piperazine, and
1.43 grams (7.5 mmol.) p-toluenesulfonic acid monohydrate was left at 160° C. for 47 hours, allowing the water which was formed during the reaction to distill off. The cooled reaction mixture was partitioned between ethyl ether and a saturated solution of NaHCO$_3$. The organic phase was washed with water until neutral, extracted with a 0.1 N maleic acid solution. The acid phase was made alkaline with a saturated solution of NaHCO$_3$, and extracted in ether. This organic phase was washed with water until neutral, dried over anhydrous Na$_2$SO$_4$, and the solvent distilled off. The residue (3 grams) was dissolved in petroleum ether, filtered through a small layer of Al$_2$O$_3$ activity I, neutral, and the solvent distilled off. The residue was crystallized from petroleum ether yielding 1.2 grams of compound in the form of white crystals with a melting point of 68 to 70° C.

U.V. in ethanol 95%
$\lambda$ max.=301 m$\mu$; $\epsilon$=13,400

EXAMPLE XIV

N-[8-methyl-5H-dibenzo(a,d)cyclohepten-10-yl]-N'-(N-ethylacetamide)-piperazine

To a solution of 10 grams (34.4 mmol.) N-[8-methyl-5H-dibenzo(a,d)cyclohepten-10-yl]-piperazine in
200 ml. anhydrous benzene were added
21.2 grams (200 mmol.) anhydrous Na$_2$CO$_3$ and
5 grams (41.2 mmol.) N-ethylchloroacetamide.

The mixture was refluxed under stirring for 24 hours. After cooling, it was poured over crushed ice and then extracted with benzene. The benzene phase was washed with water until neutral, dried over anhydrous Na$_2$SO$_4$, and the solvent distilled under vacuum (water pump). The residue was crystallized from ethanol yielding 6.5 grams of white crystals with a melting point of 166 to 167° C.

U.V. in ethanol 95%
$\lambda$ max.=301 m$\mu$; $\epsilon$=13,400

EXAMPLE XV

N-[8-chloro-5H-dibenzo(a,d)cyclohepten-10-yl]-N'-(N-ethylacetamide)-piperazine 6.5 grams (20.9 mmol.) N-[8-chloro-5H-dibenzo(a,d)cyclohepten-10-yl]-piperazine,
3.2 grams (26.3 mmol.) N-ethyl-chloroacetamide, and
13 grams (122 mmol.) anhydrous Na$_2$CO$_3$ in
50 ml. anhydrous benzene were refluxed under stirring for 24 hours. The cooled mixture was poured into water. The benzene phase was separated and washed with water until neutral, dried over anhydrous Na$_2$SO$_4$ and then distilled off. The residue was crystallized from methanol yielding 3.3 grams with a melting point of 154° C. (decomposition).

U.V. in ethanol 95%
$\lambda$ max.=305 m$\mu$; $\epsilon$=11,500

The pharmacological activity of the above compounds is shown in the following tables.

TABLE I

Spontaneous motility (mouse)

Method: Dews
Administration route: per os
Dose: ⅕ LD$_{50}$

| Compound of: | Percent reduction of passages |
|---|---|
| Example I | −76 |
| Example II | −84 |
| Example III | −90 |
| Example IV | −93 |
| Example XI | −94 |

TABLE II

Anti-inflammatory activity (rat)

Method: Carrageenan oedema
Administration route: per os
Dose: ⅕ LD$_{50}$

| Compound of: | Percent reduction of oedema |
|---|---|
| Example I | −70 |
| Example III | −90 |
| Example IV | −87 |
| Example XI | −67 |

TABLE III

Hypothermia (rat)

Administration route: per os
Dose: ⅕ LD₅₀

| Compound of: | Mod. body temp. °C. after (time) |
|---|---|
| Example I | −1.4 (1 hour) |
| Example II | −1.8 (2 hours) |
| Example III | −1.3 (1 hour) |
| Example XI | −1.4 (1 hour) |

TABLE IV

Analgesic activity (mouse)

Method: Hot plate
Administration route: per os
Dose: ⅕ LD₅₀

| Compound of: | Percent time Modification |
|---|---|
| Example I | +331 |
| Example II | +351 |
| Example III | +371 |
| Example IV | +536 |

TABLE V

Myorelaxing activity (mouse)

Administration route: per os
Dose: ⅕ LD₅₀

| Compound of: | Percent of fallen animals |
|---|---|
| Example II | 60 |
| Example III | 60 |
| Example IV | 100 |

What is claimed is:

1. N-[5H-dibenzo(a,d)cyclohepten - 10 - yl]-N'-(N-methylacetamide)-piperazine.

2. N - [5H - dibenzo(a,d)cyclohepten-10-yl]-N'-[N,N-dimethylacetamide]-piperazine.

3. N-[5H - dibenzo(a,d)cyclohepten-10-yl]-piperazine-N'-yl-phenylcarboxamide.

4. N-[8-chloro-5H-dibenzo(a,d)cyclohepten - 10 - yl]-N'-(N-ethylacetamide)-piperazine.

5. A 5H-dibenzo(a,d)cyclohepten - 10 - yl-piperazine compound having the formula

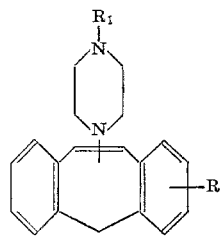

wherein R is hydrogen, halogen or lower alkyl and R₁ is (lower)alkyl carboxamide, di(lower)alkyl carboxamide, (lower)alkyl acetamide, di(lower)alkyl acetamide, phenylcarboxamide and halogen substituted phenylcarboxamide.

6. The compound of claim 5 which is N-[5H-dibenzo-(a,d)cyclohepten-10-yl] - N' - (N-ethylacetamide)-piperazine.

7. The compound of claim 5 which is N-[5H-dibenzo-(a,d)cyclohepten-10-yl] - N' - (N-n-propylacetamide)-piperazine.

8. The compound of claim 5 which is N-[5H-dibenzo-(a,d)cyclohepten - 10 - yl]-N'-n-butylcarboxamide-piperazine.

9. The compound of claim 5 which is N-[8-methyl-5H-dibenzo(a,d)cyclohepten-10-yl]-N'-(N - ethylacetamide)-piperazine.

10. A compound of claim 5 which is N-[5H-dibenzo-(a,d)cyclohepten - 10-yl]-piperazine-N'-yl-chlorophenylcarboxamide.

References Cited

UNITED STATES PATENTS

| 3,290,313 | 12/1966 | Cusic et al. | 260—268 |
| 3,320,259 | 5/1967 | Cusic et al. | 260—268 |
| 3,325,497 | 6/1967 | Fouche | 260—268 |
| 3,377,344 | 4/1968 | Cusic et al. | 260—268 |
| 3,457,264 | 7/1969 | Viterbo et al. | 260—268 |
| 3,459,745 | 8/1969 | Fouche | 260—268 |

DONALD G. DAUS, Primary Examiner

U.S. Cl. X.R.

260—453, 561, 590; 424—250

PO-1050
(5/69)

UNITED STATES PATENT OFFICE
CERTIFICATE OF CORRECTION

Patent No. 3,575,980　　　　　　　　Dated　April 20, 1971

Inventor(s) Michele Mastursi, Sabino Lembo and Rene Viterbo

It is certified that error appears in the above-identified patent and that said Letters Patent are hereby corrected as shown below:

Column 5, line 7 reads "2.2 ml. (33 mmol.) acrylonitrile were dissolved in"

and should read

"1 ml (8.2 mmol) phenyl isothiocyana dissolved in"

Signed and sealed this 9th day of November 1971.

(SEAL)
Attest:

EDWARD M. FLETCHER, JR.　　　　ROBERT GOTTSCHALK
Attesting Officer　　　　　　　　Acting Commissioner of Patent